(12) United States Patent
Sugii et al.

(10) Patent No.: US 12,534,411 B2
(45) Date of Patent: Jan. 27, 2026

(54) FERRITE CERAMIC COMPOSITION AND COIL COMPONENT

(71) Applicant: Murata Manufacturing Co., Ltd., Kyoto-fu (JP)

(72) Inventors: Kazutoshi Sugii, Nagaokakyo (JP); Takashi Sakai, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 965 days.

(21) Appl. No.: 17/710,698

(22) Filed: Mar. 31, 2022

(65) Prior Publication Data

US 2022/0324757 A1    Oct. 13, 2022

(30) Foreign Application Priority Data

Apr. 8, 2021 (JP) ................................ 2021-066047

(51) Int. Cl.
| | |
|---|---|
| *H01F 27/28* | (2006.01) |
| *C04B 35/26* | (2006.01) |
| *H01F 1/34* | (2006.01) |
| *H01F 17/00* | (2006.01) |
| *H01F 27/29* | (2006.01) |

(52) U.S. Cl.
CPC ........... *C04B 35/265* (2013.01); *H01F 1/344* (2013.01); *H01F 27/292* (2013.01)

(58) Field of Classification Search
CPC ... H01F 1/344; H01F 1/34; H01F 1/37; H01F 5/06; H01F 27/28; H01F 27/26; H01F 27/2866; H01F 17/0013; H01F 2017/046; C04B 35/2658; C04B 35/265; C04B 35/2666; C04B 2235/95
See application file for complete search history.

(56) References Cited

U.S. PATENT DOCUMENTS

| | | | |
|---|---|---|---|
| 6,304,164 | B1 | 10/2001 | Ohno et al. |
| 2010/0194513 | A1 | 8/2010 | Ozawa et al. |
| 2014/0333405 | A1 | 11/2014 | Choto et al. |

(Continued)

FOREIGN PATENT DOCUMENTS

| | | |
|---|---|---|
| CN | 106057393 A | 10/2016 |
| CN | 112331444 A | 2/2021 |

(Continued)

*Primary Examiner* — Matthew E. Hoban
*Assistant Examiner* — Lynne Edmondson
(74) *Attorney, Agent, or Firm* — Studebaker Brackett PLLC

(57) ABSTRACT

A ferrite ceramic composition includes, as main components, from 27.0 mol % to 41.0 mol % of Fe in terms of $Fe_2O_3$, from 16.0 mol % to 24.0 mol % of Ni in terms of NiO, from 23.0 mol % to 37.0 mol % of Zn in terms of ZnO, from 5.0 mol % to 9.0 mol % of Cu in terms of CuO, and from 4.0 mol % to 14.0 mol % of Si in terms of $SiO_2$, and as sub-components, relative to 100 parts by mass of the main components, from 0.3 parts by mass to 1.2 parts by mass of Bi in terms of $Bi_2O_3$, from 0.3 parts by mass to 1.2 parts by mass of Co in terms of $Co_3O_4$, from 0.01 parts by mass to 0.25 parts by mass of Mn in terms of $Mn_2O_3$, and from 0.003 parts by mass to 0.030 parts by mass of Cr in terms of $Cr_2O_3$.

20 Claims, 2 Drawing Sheets

(56) References Cited

U.S. PATENT DOCUMENTS

| | | | |
|---|---|---|---|
| 2015/0097137 A1* | 4/2015 | Wada | ................ C04B 35/62645 |
| | | | 252/62.6 |
| 2016/0293301 A1* | 10/2016 | Choto | ................. H01F 17/0013 |
| 2016/0314891 A1 | 10/2016 | Onozaki et al. | |

FOREIGN PATENT DOCUMENTS

| JP | H11-297531 A | 10/1999 |
|---|---|---|
| JP | 2010-103266 A | 5/2010 |
| JP | 2016-196397 A | 11/2016 |
| JP | 2016-196398 A | 11/2016 |
| JP | 2019-210204 A | 12/2019 |
| JP | 2020-194811 A | 12/2020 |
| JP | 2021-027159 A | 2/2021 |

* cited by examiner

FIG. 3A
FIG. 3B
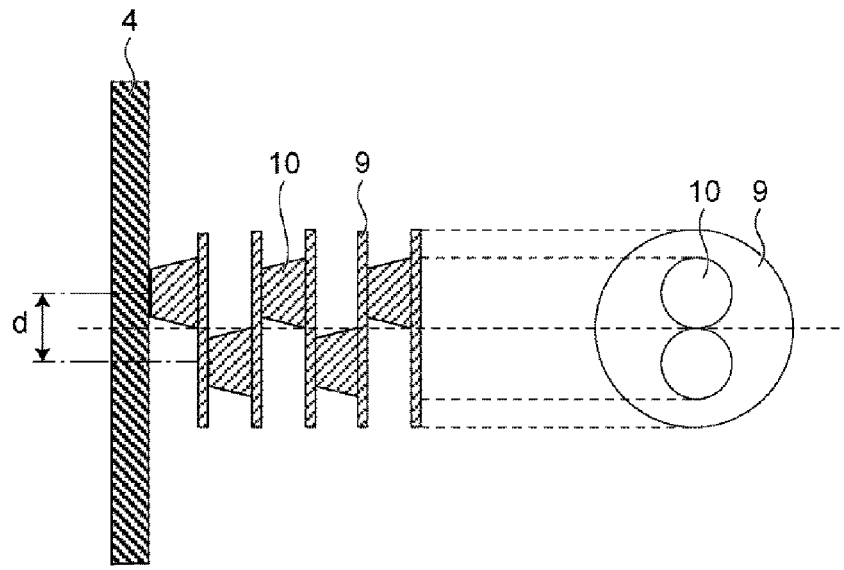
FIG. 4A
FIG. 4B
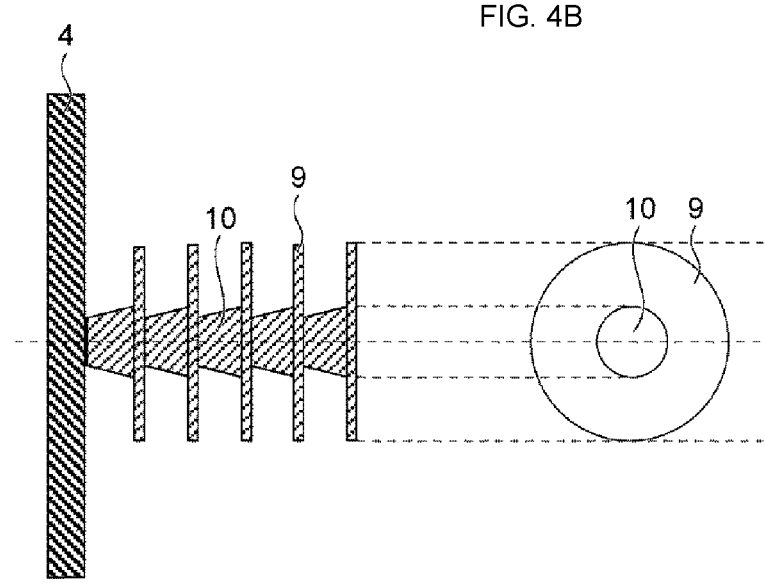

FERRITE CERAMIC COMPOSITION AND COIL COMPONENT

CROSS-REFERENCE TO RELATED APPLICATION

This application claims benefit of priority to Japanese Patent Application No. 2021-066047 filed Apr. 8, 2021, the entire content of which is incorporated herein by reference.

BACKGROUND

Technical Field

The present disclosure relates to a ferrite ceramic composition and a coil component.

Background Art

It has been reported that, in a coil component, the use of a composite magnetic material that contains a ferrite composition and zinc silicate can provide an electronic component including an element body with a high specific resistance, as described, for example, in Japanese Unexamined Patent Application Publication No. 2019-210204.

SUMMARY

Japanese Unexamined Patent Application Publication No. 2019-210204 discloses an electronic component including an element body with a high specific resistance; however, the composite magnetic material described in Japanese Unexamined Patent Application Publication No. 2019-210204 may have insufficient flexural strength and magnetic permeability.

Accordingly, the present disclosure provides a ferrite ceramic composition having high flexural strength and magnetic permeability.

The present disclosure includes the following embodiments.

[1] A ferrite ceramic composition includes as main components, 27.0 mol % or more and 41.0 mol % or less (i.e., from 27.0 mol % to 41.0 mol %) of Fe in terms of $Fe_2O_3$; 16.0 mol % or more and 24.0 mol % or less (i.e., from 16.0 mol % to 24.0 mol %) of Ni in terms of NiO; 23.0 mol % or more and 37.0 mol % or less (i.e., from 23.0 mol % to 37.0 mol %) of Zn in terms of ZnO; 5.0 mol % or more and 9.0 mol % or less (i.e., from 5.0 mol % to 9.0 mol %) of Cu in terms of CuO; and 4.0 mol % or more and 14.0 mol % or less (i.e., from 4.0 mol % to 14.0 mol %) of Si in terms of $SiO_2$; and as sub-components, relative to 100 parts by mass of the main components, 0.3 parts by mass or more and 1.2 parts by mass or less (i.e., from 0.3 parts by mass to 1.2 parts by mass) of Bi in terms of $Bi_2O_3$; 0.3 parts by mass or more and 1.2 parts by mass or less (i.e., from 0.3 parts by mass to 1.2 parts by mass) of Co in terms of $Co_3O_4$; 0.01 parts by mass or more and 0.25 parts by mass or less (i.e., from 0.01 parts by mass to 0.25 parts by mass) of Mn in terms of $Mn_2O_3$; and 0.003 parts by mass or more and 0.030 parts by mass or less (i.e., from 0.003 parts by mass to 0.030 parts by mass) of Cr in terms of $Cr_2O_3$.

[2] In the ferrite ceramic composition according to [1] described above, an average crystal grain size of crystal grains in the ferrite ceramic composition may be 0.2 μm or more and 0.8 μm or less (i.e., from 0.2 μm to 0.8 μm).

[3] In the ferrite ceramic composition according to [1] or [2] described above, an average crystal grain size of crystal grains in the ferrite ceramic composition may be 0.2 μm or more and 0.5 μm or less (i.e., from 0.2 μm to 0.5 μm).

[4] The ferrite ceramic composition according to any one of [1] to [3] described above may include a magnetic phase containing at least Fe, Ni, Zn, and Cu and a non-magnetic phase containing at least Si and Zn.

[5] A coil component includes an insulator part; a coil that is embedded in the insulator part and includes a plurality of coil conductor layers electrically connected together; and outer electrodes that are disposed on surfaces of the insulator part and are electrically connected to the coil, in which the insulator part is formed of the ferrite ceramic composition according to any one of [1] to [4] described above.

[6] In the coil component according to [5] described above, the insulator part may have a dimension of 0.95 mm or more and 1.05 mm or less (i.e., from 0.95 mm to 1.05 mm) in a length direction and a dimension of 0.45 mm or more and 0.55 mm or less (i.e., from 0.45 mm to 0.55 mm) in a width direction.

The present disclosure can provide a ferrite ceramic composition having high flexural strength and magnetic permeability.

BRIEF DESCRIPTION OF THE DRAWINGS

FIGS. 3A and 3B are sectional views illustrating an extended portion in which via conductors are alternately disposed; and FIGS. 4A and 4B are sectional views illustrating an extended portion in which via conductors are disposed such that the centers thereof coincide with each other.

DETAILED DESCRIPTION

Figure 1:
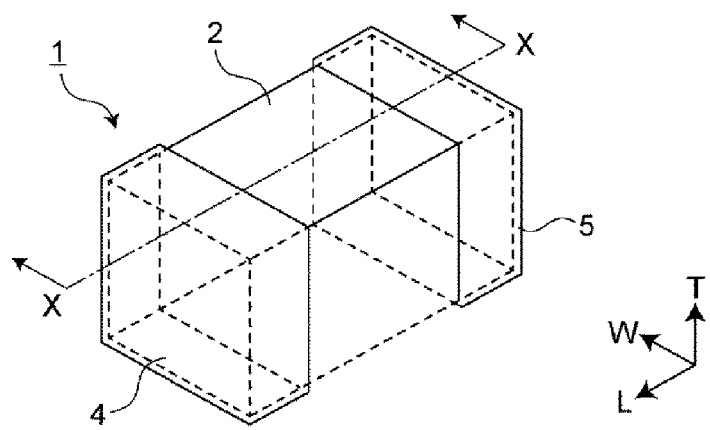
FIG. 1 is a perspective view that schematically illustrates a coil component according to the present disclosure.

A ferrite ceramic composition according to the present disclosure includes main components and sub-components.

The main components contain Fe, Ni, Zn, Cu, and Si.

The Fe content is, in terms of $Fe_2O_3$, 27.0 mol % or more and 41.0 mol % or less (i.e., from 27.0 mol % to 41.0 mol %) (with reference to the total of the main components; the same applies hereinafter) and is preferably 30.0 mol % or more and 38.0 mol % or less (i.e., from 30.0 mol % to 38.0 mol %).

The Ni content is, in terms of NiO, 16.0 mol % or more and 24.0 mol % or less (i.e., from 16.0 to 24.0 mol %) (with reference to the total of the main components; the same applies hereinafter) and is preferably 17.0 mol % or more and 20.0 mol % or less (i.e., from 17.0 mol % to 20.0 mol %).

The Zn content is, in terms of ZnO, 23.0 mol % or more and 37.0 mol % or less (i.e., from 23.0 mol % to 37.0 mol %) (with reference to the total of the main components; the same applies hereinafter) and is preferably 25.0 mol % or more and 35.0 mol % or less (i.e., from 25.0 mol % to 35.0 mol %).

The Cu content is, in terms of CuO, 5.0 mol % or more and 9.0 mol % or less (i.e., from 5.0 mol % to 9.0 mol %) (with reference to the total of the main components; the same applies hereinafter) and is preferably 6.0 mol % or more and 8.0 mol % or less (i.e., from 6.0 mol % to 8.0 mol %).

The Si content is, in terms of $SiO_2$, 4.0 mol % or more and 14.0 mol % or less (i.e., from 4.0 mol % to 14.0 mol %)

(with reference to the total of the main components; the same applies hereinafter) and is preferably 6.0 mol % or more and 12.0 mol % or less (i.e., from 6.0 mol % to 12.0 mol %).

When the contents of Fe, Ni, Zn, Cu, and Si are within the above ranges, good flexural strength and magnetic permeability can be obtained.

The sub-components contain Bi, Co, Mn, and Cr.

The Bi content is, in terms of $Bi_2O_3$, 0.3 parts by mass or more and 1.2 parts by mass or less (i.e., from 0.3 parts by mass to 1.2 parts by mass) and is preferably 0.4 parts by mass or more and 0.8 parts by mass or less (i.e., from 0.4 parts by mass to 0.8 parts by mass) relative to 100 parts by mass of the main components.

The Co content is, in terms of $Co_3O_4$, 0.3 parts by mass or more and 1.2 parts by mass or less (i.e., from 0.3 parts by mass to 1.2 parts by mass) and is preferably 0.4 parts by mass or more and 0.8 parts by mass or less (i.e., from 0.4 parts by mass to 0.8 parts by mass) relative to 100 parts by mass of the main components.

The Mn content is, in terms of $Mn_2O_3$, 0.01 parts by mass or more and 0.25 parts by mass or less and is preferably 0.05 parts by mass or more and 0.20 parts by mass or less (i.e., from 0.05 parts by mass to 0.20 parts by mass) relative to 100 parts by mass of the main components.

The Cr content is, in terms of $Cr_2O_3$, 0.003 parts by mass or more and 0.030 parts by mass or less and is preferably 0.005 parts by mass or more and 0.020 parts by mass or less (i.e., from 0.005 parts by mass to 0.020 parts by mass) relative to 100 parts by mass of the main components.

When the contents of Bi, Co, Mn, and Cr are within the above ranges, good flexural strength and magnetic permeability can be obtained.

An average crystal grain size of crystal grains in the ferrite ceramic composition is preferably 0.2 μm or more and 0.8 μm or less (i.e., from 0.2 μm to 0.8 μm) and more preferably 0.2 μm or more and 0.5 μm or less (i.e., from 0.2 μm to 0.5 μm). When the average crystal grain size is within the above range, withstand voltage characteristics of the ferrite ceramic composition are improved.

The average crystal grain size can be measured as follows.

A ferrite ceramic composition is formed in a plate shape to prepare a sample, the sample is embedded in a resin such that a predetermined surface is exposed, and the resulting sample is polished with a polishing machine until a substantially central portion of the sample is exposed. After polishing, the section is processed by a focused ion-beam (FIB) to prepare a section for observation. For the section processed by FIB, crystal grain sizes are measured in an observation area (8 μm×8 μm) to determine the average crystal grain size. Herein, the average crystal grain size refers to a grain size at which the area equivalent circle diameter of a crystal grain reaches 50% on a number basis.

In a preferred embodiment, the ferrite ceramic composition includes a magnetic phase and a non-magnetic phase.

The magnetic phase contains at least Fe, Ni, Zn, and Cu as main components.

In the magnetic phase, the Fe content is, in terms of $Fe_2O_3$, preferably 40.0 mol % or more and 49.5 mol % or less (i.e., from 40.0 mol % to 49.5 mol %) (with reference to the total of the main components; the same applies hereinafter) and more preferably 45.0 mol % or more and 49.5 mol % or less (i.e., from 45.0 mol % to 49.5 mol %).

In the magnetic phase, the Zn content is, in terms of ZnO, preferably 2.0 mol % or more and 35.0 mol % or less (i.e., from 2.0 mol % to 35.0 mol %) (with reference to the total of the main components; the same applies hereinafter) and more preferably 5.0 mol % or more and 30.0 mol % or less (i.e., from 5.0 mol % to 30.0 mol %).

In the magnetic phase, the Cu content is, in terms of CuO, preferably 6.0 mol % or more and 13.0 mol % or less (i.e., from 6.0 mol % to 13.0 mol %) (with reference to the total of the main components; the same applies hereinafter) and more preferably 7.0 mol % or more and 10.0 mol % or less (i.e., from 7.0 mol % to 10.0 mol %).

In the magnetic phase, the Ni content is, in terms of NiO, preferably 10.0 mol % or more and 45.0 mol % or less (i.e., from 10.0 mol % to 45.0 mol %) (with reference to the total of the main components; the same applies hereinafter) and more preferably 15.0 mol % or more and 40.0 mol % or less (i.e., from 15.0 mol % to 40.0 mol %).

The magnetic phase may further contain impurities that are unavoidable during the production.

The non-magnetic phase contains at least Si and Zn as main components.

In the non-magnetic phase, a ratio (Zn/Si) of the Zn content to the Si content is preferably 1.8 or more and 2.2 or less (i.e., from 1.8 to 2.2) and more preferably 1.9 or more and 2.1 or less (i.e., from 1.9 to 2.1), where the Zn content is expressed in terms of ZnO and the Si content is expressed in terms of $SiO_2$. When the ratio of the Zn content to the Si content is within the above range, good electrical characteristics can be obtained.

The non-magnetic phase may further contain impurities that are unavoidable during the production.

In the ferrite ceramic composition according to the present disclosure, a ratio (magnetic phase/non-magnetic phase) of the magnetic phase to the non-magnetic phase can be represented by a ratio of Fe to Si in the ferrite ceramic composition. The ratio of the magnetic phase to the non-magnetic phase may preferably be 2.0 or more and 9.0 or less (i.e., from 2.0 to 9.0) and more preferably 2.0 or more and 5.0 or less (i.e., from 2.0 to 5.0) in terms of a molar ratio ($Fe_2O_3/SiO_2$) determined when Fe and Si are expressed in terms of $Fe_2O_3$ and $SiO_2$, respectively.

The ferrite ceramic composition further contains Bi, Co, Mn, and Cr as the sub-components.

In the ferrite ceramic composition, the Bi content is, in terms of $Bi_2O_3$, 0.3 parts by mass or more and 1.2 parts by mass (i.e., from 0.3 parts by mass to 1.2 parts by mass) or less and is preferably 0.4 parts by mass or more and 0.8 parts by mass or less (i.e., from 0.4 parts by mass to 0.8 parts by mass) relative to 100 parts by mass of the main components.

In the ferrite ceramic composition, the Co content is, in terms of $Co_3O_4$, 0.3 parts by mass or more and 1.2 parts by mass or less (i.e., from 0.3 parts by mass to 1.2 parts by mass) and is preferably 0.4 parts by mass or more and 0.8 parts by mass or less (i.e., from 0.4 parts by mass to 0.8 parts by mass) relative to 100 parts by mass of the main components.

In the ferrite ceramic composition, the Mn content is, in terms of $Mn_2O_3$, 0.01 parts by mass or more and 0.25 parts by mass or less (i.e., from 0.01 parts by mass to 0.25 parts by mass) and is preferably 0.05 parts by mass or more and 0.20 parts by mass or less (i.e., from 0.05 parts by mass to 0.20 parts by mass) relative to 100 parts by mass of the main components.

In the ferrite ceramic composition, the Cr content is, in terms of $Cr_2O_3$, 0.003 parts by mass or more and 0.030 parts by mass or less (i.e., from 0.003 parts by mass to 0.030 parts by mass) and is preferably 0.005 parts by mass or more and 0.020 parts by mass or less (i.e., from 0.005 parts by mass to 0.020 parts by mass or less) relative to 100 parts by mass of the main components.

The ferrite ceramic composition according to the present disclosure can provide a coil component with high flexural strength, high magnetic permeability, and high direct current superposition characteristics when used as the material of an insulator part of the coil component.

Accordingly, the present disclosure provides a coil component that includes an insulator part, a coil that is embedded in the insulator part and includes a plurality of coil conductor layers electrically connected together, and outer electrodes that are disposed on surfaces of the insulator part and are electrically connected to the coil, in which the insulator part is formed of the ferrite ceramic composition according to the present disclosure.

A coil component according to the present disclosure will be described in detail below with reference to the drawings. The shape, arrangement, and other features of the coil component of this embodiment and respective constituent elements thereof are not limited to the examples illustrated in the drawings.

Figure 2:
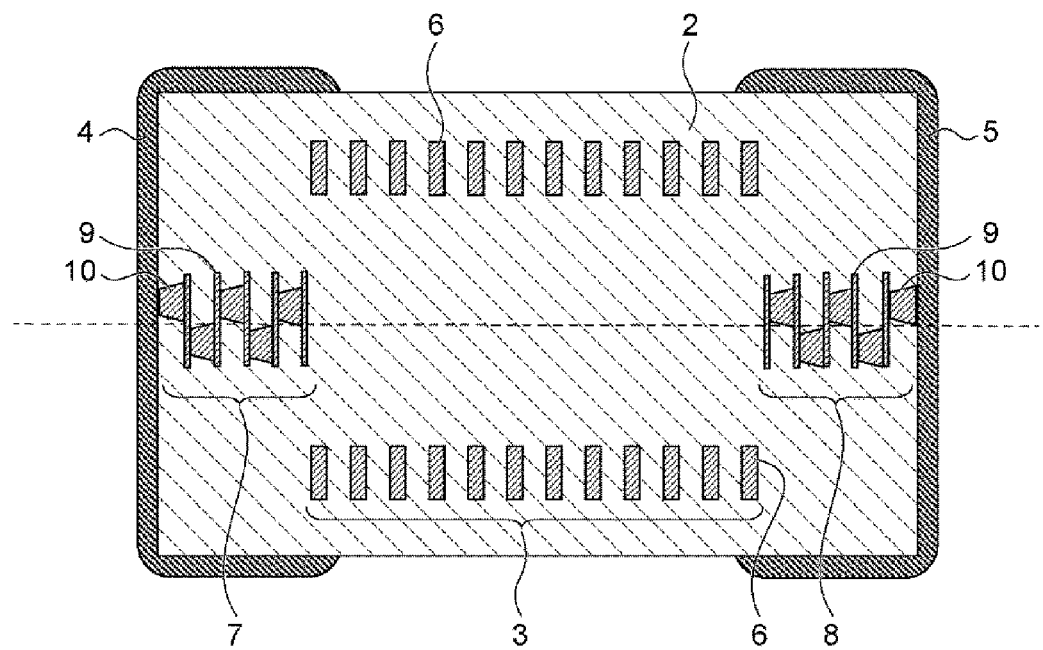
FIG. 2 is a sectional view illustrating a section taken along line x-x of the coil component illustrated in FIG. 1.

FIG. 1 is a perspective view of a coil component 1 of this embodiment, and FIG. 2 is a sectional view taken along line x-x in FIG. 1. The shape, arrangement, and other features of the coil component of the embodiment described below and respective constituent elements thereof are not limited to the examples illustrated in the drawings.

As illustrated in FIGS. 1 and 2, the coil component 1 of this embodiment is a coil component having a substantially rectangular parallelepiped shape. In the coil component 1, surfaces perpendicular to an L axis in FIG. 1 are referred to as "end surfaces", surfaces perpendicular to a W axis are referred to as "side surfaces", and surfaces perpendicular to a T axis are referred to as "an upper surface" and "a lower surface". The coil component 1 schematically includes an insulator part 2 and outer electrodes 4 and 5 disposed on two end surfaces of the insulator part 2. The insulator part 2 includes a coil 3 embedded therein. The coil 3 is constituted by coil conductor layers 6 that are stacked parallel to a mounting surface (the lower surface in this embodiment) of the coil component and that are connected together in the form of a coil through connection conductors that penetrate the insulator part 2. Of the coil conductor layers 6, coil conductor layers located at both ends are connected to outer electrodes 4 and 5 through extended portions 7 and 8, respectively.

In the coil component 1 of this embodiment, the insulator part 2 is constituted by stacking a plurality of insulator layers.

The insulator layers are preferably stacked parallel to the mounting surface of the coil component 1. That is, the insulator layers are stacked in the horizontal direction in FIG. 2.

The thickness of an insulator layer between the coil conductor layers 6 may preferably be 3 μm or more and 50 μm or less (i.e., from 3 μm to 50 μm), more preferably 3 μm or more and 40 μm or less (i.e., from 3 μm to 40 μm), and still more preferably 3 μm or more and 20 μm or less (i.e., from 3 μm to 20 μm). When the thickness is 3 μm or more, insulating properties between the coil conductor layers can be more reliably ensured. When the thickness is 50 μm or less, better electrical characteristics can be obtained.

The insulator part 2 is constituted by the ferrite ceramic composition according to the present disclosure. The ferrite ceramic composition can have the features described above.

The ferrite ceramic composition constituting the insulator part preferably includes a magnetic phase and a non-magnetic phase. When the insulator part includes the magnetic phase and the non-magnetic phase, good electrical characteristics can be obtained.

In the insulator part, the average crystal grain size of crystal grains in a substantially central portion of the insulator part is preferably 0.2 μm or more and 0.8 μm or less (i.e., from 0.2 μm to 0.8 μm), and more preferably 0.2 μm or more and 0.5 μm or less (i.e., from 0.2 μm to 0.5 μm). When the average crystal grain size is within the above range, withstand voltage characteristics of the coil component are improved.

The average crystal grain size can be measured as follows.

A sample of a coil component is embedded in a resin such that the LT surface is exposed, and the resulting sample is polished with a polishing machine in the W direction until a substantially central portion of the insulator part 2 is exposed. After polishing, the section is processed by a focused ion-beam (FIB) to prepare a section for observation. For the section processed by FIB, crystal grain sizes are measured in an observation area (8 μm×8 μm) to determine the average crystal grain size. Herein, the average crystal grain size refers to a grain size at which the area equivalent circle diameter of a crystal grain reaches 50% on a number basis.

In the insulator part, a pore area percentage in a substantially central portion of the insulator part is preferably 2.0% or more and 6.0% or less (i.e., from 2.0% to 6.0%), more preferably 2.5% or more and 5.0% or less (i.e., from 2.5% to 5.0%), and still more preferably 3.0% or more and 4.5% or less (i.e., from 3.0% to 4.5%). When the pore area percentage is within the above range, withstand voltage characteristics of the coil component are improved.

The pore area percentage can be measured as follows.

A sample of a coil component is embedded in a resin such that the LT surface is exposed, and the resulting sample is polished with a polishing machine in the W direction until a substantially central portion of the insulator part 2 is exposed. After polishing, the section is processed by a focused ion-beam (FIB) to prepare a section for observation. For the section processed by FIB, an observation area (8 μm×8 μm) is photographed with a scanning electron microscope (SEM). For the obtained SEM image, the percentage of the area occupied by pores with respect to the total area is determined by using image analysis software and is defined as the pore area percentage.

The coil 3 is constituted by the coil conductor layers 6 that are electrically connected together in the form of a coil. Of the coil conductor layers 6, coil conductor layers 6 that are adjacent to each other in the stacking direction are connected to each other through a connection conductor that penetrates the insulator part 2.

The material constituting the coil conductor layers is not particularly limited, and examples thereof include Au, Ag, Cu, Pd, and Ni. The material constituting the coil conductor layers is preferably Ag or Cu, and more preferably Ag. Only one conductive material or two or more conductive materials may be used.

The thickness of each of the coil conductor layers may preferably be 5 μm or more and 25 μm or less (i.e., from 5 μm to 25 μm), and more preferably 5 μm or more and 15 μm or less (i.e., from 5 μm to 15 μm). An increase in the thickness of the coil conductor layer further reduces the resistance value of the coil component. Herein, the thickness of the coil conductor layer refers to a thickness of the coil conductor layer in the stacking direction.

The thickness of the coil conductor layer can be measured as follows.

A sample of a coil component is embedded in a resin such that the LT surface is exposed, and the resulting sample is polished with a polishing machine in the W direction until a substantially central portion of the insulator part 2 is exposed. After polishing, the section is processed by a focused ion-beam (FIB) to prepare a section for observation. The section processed by FIB is observed with a scanning electron microscope (SEM), and the thickness at an L-dimension central portion of the coil conductor layer is measured by a measuring function accompanying the SEM.

The connection conductors are each disposed so as to penetrate the insulator part between coil conductor layers. The material constituting the connection conductors can be a material described in relation to the above-described coil conductor layers. The material constituting the connection conductors may be the same as or different from the material constituting the coil conductor layers. In a preferred embodiment, the material constituting the connection conductors is the same as the material constituting the coil conductor layers. In a preferred embodiment, the material constituting the connection conductors is Ag.

The extended portions 7 and 8 are each constituted by a plurality of land conductor layers 9 that are electrically connected together through via conductors 10.

The material constituting the land conductor layers is not particularly limited, and examples thereof include Au, Ag, Cu, Pd, and Ni. The material constituting the land conductor layers is preferably Ag or Cu, and more preferably Ag. Only one material or two or more materials may be used as the material constituting the land conductor layers. Although the material constituting the land conductor layers may be the same as or different from the material constituting the coil conductor layers, the materials are preferably the same.

The thickness of each of the land conductor layers may preferably be 5 μm or more and 25 μm or less (i.e., from 5 μm to 25 μm), and more preferably 5 μm or more and 15 μm or less (i.e., from 5 μm to 15 μm). An increase in the thickness of the land conductor layer further reduces the resistance value of the coil component. Herein, the thickness of the land conductor layer refers to a thickness of the land conductor layer in the stacking direction.

The thickness of the land conductor layer can be measured as in the thickness of the coil conductor layer.

The via conductors are each disposed so as to penetrate the insulator part between land conductor layers. The material constituting the via conductors can be a material described in relation to the above-described land conductor layers. The material constituting the via conductors may be the same as or different from the material constituting the land conductor layers. In a preferred embodiment, the material constituting the via conductors is the same as the material constituting the land conductor layers. In a preferred embodiment, the material constituting the via conductors is Ag.

In this embodiment, with regard to the via conductors in each of the extended portions, adjacent via conductors in the stacking direction have centers that do not coincide when viewed in plan in the stacking direction (FIGS. 3A and 3B). That is, the centers of the adjacent via conductors in the stacking direction are displaced from each other. Displacing the centers of the adjacent via conductors in the stacking direction from each other can suppress the occurrence of cracking in the coil component.

In this embodiment, the adjacent via conductors in the stacking direction are displaced in a staggered manner. That is, when viewed in plan in the stacking direction, the via conductors are present at two positions, and adjacent via conductors are disposed so as to be located at positions different from one another.

In another embodiment, when viewed in plan in the stacking direction, adjacent via conductors in the stacking direction may be present at three or more positions. For example, when viewed in plan in the stacking direction, in the case where adjacent via conductors in the stacking direction are present at three positions, the via conductors may be disposed such that the centers of the via conductors located at the three positions draw a triangle, preferably a regular triangle.

A displacement width (d in FIG. 3A) between the centers of adjacent via conductors in the stacking direction is preferably 5 μm or more and 50 μm or less (i.e., from 5 μm to 50 μm), and more preferably 10 μm or more and 20 μm or less (i.e., from 10 μm to 20 μm).

The displacement width between the centers of adjacent via conductors in the stacking direction is preferably 0.05 times or more and 0.5 times or less (i.e., from 0.05 times to 0.5 times), more preferably 0.1 times of more and 0.4 times or less (i.e., from 0.1 times to 0.4 times), and still more preferably 0.1 times of more and 0.3 times or less (i.e., from 0.1 times to 0.3 times) the diameter of each of the via conductors. Herein, the diameter of the via conductor refers to the diameter of the largest portion among sections (sections parallel to the stacking surface) of the via conductor.

In a preferred embodiment, adjacent via conductors in the stacking direction do not overlap when viewed in plan in the stacking direction. That is, adjacent via conductors in the stacking direction are completely independent from each other when viewed in plan in the stacking direction. That is, the displacement width (d in FIG. 3A) between the centers of adjacent via conductors in the stacking direction is larger than the sum of the radii of the adjacent via conductors.

In another embodiment, adjacent via conductors in the stacking direction have centers that coincide with each other when viewed in plan in the stacking direction (FIGS. 4A and 4B).

The outer electrodes 4 and 5 are disposed so as to cover the two end surfaces of the insulator part 2. The outer electrodes are formed of a conductive material, preferably, at least one metal material selected from Au, Ag, Pd, Ni, Sn, and Cu.

The outer electrodes may be formed of a single layer or a plurality of layers. In one embodiment, the outer electrodes can be formed of a plurality of layers and preferably formed of two or more and four or less layers, for example, three layers.

In one embodiment, the outer electrodes are formed of a plurality of layers and can include a layer containing Ag or Pd, a layer containing Ni, or a layer containing Sn. In a preferred embodiment, the outer electrodes are formed of a layer containing Ag or Pd, a layer containing Ni, and a layer containing Sn. Preferably, the above-described layers are disposed, from the coil conductor layer side, in the order of the layer containing Ag or Pd, preferably Ag, the layer containing Ni, and the layer containing Sn. Preferably, the layer containing Ag or Pd is a layer formed by baking a Ag paste or a Pd paste, and the layer containing Ni and the layer containing Sn can be plating layers.

The insulator part of the coil component according to the present disclosure preferably has a length (L) of 0.95 mm or more and 1.05 mm or less (i.e., from 0.95 mm to 1.05 mm) and a width (W) of 0.45 mm or more and 0.55 mm or less (i.e., from 0.45 mm to 0.55 mm). A height (T) is not particularly limited but may be, for example, 0.45 mm or more and 0.55 mm or less (i.e., from 0.45 mm to 0.55 mm).

A method for producing the above coil component 1 of this embodiment will be described below.

(1) Preparation of Magnetic Material (Calcined Magnetic Powder)

First, a raw material of a magnetic material is prepared. The raw material of the magnetic material contains Fe, Zn, Cu, and Ni as main components. Typically, the main components of the raw material are substantially composed of oxides of Fe, Zn, Cu, and Ni (ideally, $Fe_2O_3$, ZnO, CuO, and NiO).

As the raw material, $Fe_2O_3$, ZnO, CuO, and NiO are weighed so as to give a predetermined composition and are mixed and pulverized. The resulting powder is dried and calcined to obtain a calcined magnetic powder. Preferably, the resulting calcined magnetic powder is pulverized to obtain a fine powder.

The calcined magnetic powder preferably has a particle size of 0.1 μm or more and 0.2 μm or less (i.e., from 0.1 μm to 0.2 μm) in terms of D50. Herein, D50 refers to a size corresponding to 50% of the volume accumulation determined by a laser diffraction scattering particle size distribution measurement method.

In the calcined magnetic powder, the Fe content may preferably be, in terms of $Fe_2O_3$, 40.0 mol % or more and 49.5 mol % or less (i.e., from 40.0 mol % to 49.5 mol %) (with reference to the total of the main components; the same applies hereinafter) and more preferably 45.0 mol % or more and 49.5 mol % or less (i.e., from 45.0 mol % to 49.5 mol %).

In the calcined magnetic powder, the Zn content may preferably be, in terms of ZnO, 2.0 mol % or more and 35.0 mol % or less (i.e., from 2.0 mol % to 35.0 mol %) (with reference to the total of the main components; the same applies hereinafter) and more preferably 5.0 mol % or more and 30.0 mol % or less (i.e., from 5.0 mol % to 30.0 mol %).

In the calcined magnetic powder, the Cu content is, in terms of CuO, preferably 6.0 mol % or more and 13.0 mol % or less (i.e., from 6.0 mol % to 13.0 mol %) (with reference to the total of the main components; the same applies hereinafter) and more preferably 7.0 mol % or more and 10.0 mol % or less (i.e., from 7.0 mol % to 10.0 mol %).

In the calcined magnetic powder, the Ni content is, in terms of NiO, preferably 10.0 mol % or more and 45.0 mol % or less (i.e., from 10.0 mol % to 45.0 mol %) (with reference to the total of the main components; the same applies hereinafter) and more preferably 15.0 mol % or more and 40.0 mol % or less (i.e., from 15.0 mol % to 40.0 mol %).

In the present disclosure, the calcined magnetic powder may further contain impurities that are unavoidable during the production.

The Fe content (in terms of $Fe_2O_3$), the Zn content (in terms of ZnO), the Cu content (in terms of CuO), and the Ni content (in terms of NiO) in the calcined magnetic powder may be considered to be substantially equal to the Fe content (in terms of $Fe_2O_3$), the Zn content (in terms of ZnO), the Cu content (in terms of CuO), and the Ni content (in terms of NiO), respectively, in the sintered magnetic material after firing.

(2) Preparation of Non-Magnetic Material (Calcined Non-Magnetic Powder)

First, a raw material of a non-magnetic material is prepared. The raw material of the non-magnetic material contains Si and Zn as main components. Typically, the main components of the raw material are substantially composed of oxides of Si and Zn (ideally, $SiO_2$ and ZnO).

As the raw material, $SiO_2$, ZnO, and, as needed, additive components are weighed so as to give a predetermined composition and are mixed and pulverized. The resulting powder is dried and calcined to obtain a calcined non-magnetic powder. Preferably, the resulting calcined non-magnetic powder is pulverized to obtain a fine powder.

The calcined non-magnetic powder preferably has a particle size of 0.1 μm or more and 0.2 μm or less (i.e., from 0.1 μm to 0.2 μm) in terms of D50. Herein, D50 refers to a size corresponding to 50% of the volume accumulation determined by a laser diffraction scattering particle size distribution measurement method.

The Si content (in terms of $SiO_2$) and the Zn content (in terms of ZnO) in the calcined non-magnetic powder may be considered to be substantially equal to the Si content (in terms of $SiO_2$) and the Zn content (in terms of ZnO), respectively, in the sintered non-magnetic material after firing.

(3) Preparation of Conductive Paste

First, a conductive material is prepared. Examples of the conductive material include Au, Ag, Cu, Pd, and Ni. Of these, Ag or Cu is preferred, and Ag is more preferred. A predetermined amount of a powder of the conductive material is weighed and kneaded with predetermined amounts of a solvent (such as eugenol), a resin (such as ethyl cellulose), and a dispersant in a planetary mixer or the like, and the resulting mixture is then dispersed in a three-roll mill or the like. Thus, a conductive paste can be prepared.

(4) Fabrication of Sheets

The magnetic material and the non-magnetic material prepared as described above, and, in addition, Bi, Co, Mn, and Cr that serve as sub-components and are in the form of oxides ($Bi_2O_3$, $Co_3O_4$, $Mn_2O_3$, and $Cr_2O_3$) are mixed so as to give a predetermined composition. The mixture of these is placed in, for example, a ball mill along with PSZ media, and an organic binder such as polyvinyl butyral, an organic solvent such as ethanol or toluene, and a plasticizer are further added thereto and mixed to obtain a slurry. Next, the slurry is formed into a sheet by the doctor blade method or the like, and the sheet is punched into a rectangular shape to fabricate green sheets.

The content of Bi serving as the sub-component is, in terms of $Bi_2O_3$, 0.3 parts by mass or more and 1.2 parts by mass or less (i.e., from 0.3 parts by mass to 1.2 parts by mass) and is preferably 0.4 parts by mass or more and 0.8 parts by mass or less (i.e., from 0.4 parts by mass to 0.8 parts by mass) relative to 100 parts by mass of the main components.

The content of Co serving as the sub-component is, in terms of $Co_3O_4$, 0.3 parts by mass or more and 1.2 parts by mass or less (i.e., from 0.3 parts by mass to 1.2 parts by mass) and is preferably 0.4 parts by mass or more and 0.8 parts by mass or less (i.e., from 0.4 parts by mass to 0.8 parts by mass) relative to 100 parts by mass of the main components.

The content of Mn serving as the sub-component is, in terms of $Mn_2O_3$, 0.01 parts by mass or more and 0.25 parts by mass or less (i.e., from 0.01 parts by mass to 0.25 parts by mass) and is preferably 0.05 parts by mass or more and 0.20 parts by mass or less (i.e., from 0.05 parts by mass to 0.20 parts by mass) relative to 100 parts by mass of the main components.

The content of Cr serving as the sub-component is, in terms of $Cr_2O_3$, 0.003 parts by mass or more and 0.030 parts by mass or less (i.e., from 0.003 parts by mass to 0.030 parts by mass) and is preferably 0.005 parts by mass or more and 0.020 parts by mass or less (i.e., from 0.005 parts by mass to 0.020 parts by mass) relative to 100 parts by mass of the main components.

The thickness of each of the green sheets may be, for example, 5 µm or more and 40 µm or less (i.e., from 5 µm to 40 µm), and preferably 10 µm or more and 25 µm or less (i.e., from 10 µm to 25 µm). When the thickness of the green sheet is within the above range, high insulating properties and good electrical characteristics can be obtained.

A blending ratio (magnetic material:non-magnetic material (mass ratio)) of the magnetic material to the non-magnetic material in the mixture may preferably be 90:10 to 5:95, and more preferably 90:10 to 50:50. When the blending ratio of the magnetic material to the non-magnetic material is within the above range, good electrical characteristics can be obtained.

Next, the green sheets fabricated as described above are subjected to laser irradiation to form via holes at predetermined positions. The via holes are filled with the conductive paste prepared as described above by applying the conductive paste by screen printing to form connection conductor patterns and connection via patterns. Furthermore, the conductive paste is applied to the green sheets by screen printing to form coil patterns and land patterns.

(5) Stacking, Pressure-Bonding, and Division into Individual Pieces

The green sheets obtained as described above are stacked so as to obtain predetermined coil patterns, and the resulting stack is thermally pressure-bonded to fabricate a multilayer block. The resulting multilayer block is cut with a dicer or the like to be divided into individual pieces, thus obtaining an unfired element body.

(6) Firing

The unfired element body obtained as described above is fired to obtain an element body of a coil component.

The firing temperature may preferably be 850° C. or higher and 950° C. or lower (i.e., from 850° C. to 950° C.), and more preferably 900° C. or higher and 920° C. or lower (i.e., from 900° C. to 920° C.).

The firing time may preferably be one hour or more and six hours or less (i.e., from one hour to six hours), and more preferably two hours or more and four hours or less (i.e., from two hours to four hours).

After firing, the resulting element body may be placed in a rotary barrel machine along with media and rotated to round edges and corners of the element body.

(7) Formation of Electrodes

First, base electrodes are formed. The base electrodes can be formed by, for example, applying a conductive paste containing Ag and glass to end surfaces to which the coil is extended, and baking the conductive paste.

The thickness of each of the base electrodes may be, for example, 0.1 µm or more and 20 µm or less (i.e., from 0.1 µm to 20 µm), preferably 3 µm or more and 17 µm or less (i.e., from 3 µm to 17 µm), and more preferably 5 µm or more and 15 µm or less (i.e., from 5 µm to 15 µm).

The temperature during the baking may be, for example, 800° C. or higher and 820° C. or lower (i.e., from 800° C. to 820° C.).

For the element body having the base electrodes thereon, a coating film formed of a metal layer is formed on the base electrodes by electrolytic plating. The coating film may be formed of a single layer or a plurality of layers. For example, a Ni coating film may be formed on the base electrodes, and a Sn coating film may then be formed.

Although one embodiment of the present disclosure has been described above, various modifications can be made to this embodiment.

The present disclosure will now be described with reference to Examples.

The present disclosure is not limited to these Examples.

EXAMPLES

Examples

Preparation of Magnetic Material $Fe_2O_3$, ZnO, NiO, and CuO were blended in a ratio of 47.0 mol %, 16.0 mol %, 27.0 mol %, and 10.0 mol %, respectively, to obtain a mixture. The mixture was wet-mixed, pulverized, and then dried to remove moisture. The resulting dried product was calcined at a temperature of 800° C. for two hours. The resulting calcined product was wet-pulverized until D50 reached 0.2 µm to prepare a magnetic material.

Preparation of Non-Magnetic Material

ZnO and $SiO_2$ were blended in a molar ratio of 2:1, wet-mixed, pulverized, and then dried to remove moisture. The resulting dried product was calcined at a temperature of 1,100° C. for two hours. The resulting calcined product was wet-pulverized until D50 reached 0.2 µm to prepare a non-magnetic material.

Fabrication of Green Sheets

The obtained magnetic material and non-magnetic material and, relative to 100 parts by mass of the total of the magnetic material and the non-magnetic material, $Bi_2O_3$, $Co_3O_4$, $Mn_2O_3$, and $Cr_2O_3$ were weighed so as to achieve proportions shown in Table 1 below, and predetermined amounts of an organic binder such as polyvinyl butyral, an organic solvent such as ethanol or toluene, and a plasticizer were placed in a ball mill and mixed. Next, the resulting mixture was formed into a sheet having a film thickness of about 25 µm by the doctor blade method, and the sheet was punched into a rectangular shape to prepare green sheets.

Fabrication of Ferrite Ceramic Composition

A plurality of green sheets fabricated above were stacked and pressure-bonded to fabricate a multilayer body block. The multilayer body block was punched into a single-plate shape and a ring shape, and firing was performed at 920° C. for 4 hours to fabricate a single-plate sample and a ring-shaped sample of a ferrite ceramic composition.

Single-plate sample: 4 mm×2 mm×1.5 mm

Ring-shaped sample: outer diameter 20 mm, inner diameter 12 mm, thickness 1.5 mm

TABLE 1

| Sample number | Main component (mol %) | | | | | Sub-component | | | |
|---|---|---|---|---|---|---|---|---|---|
| | NiO | ZnO | CuO | Fe$_2$O$_3$ | SiO$_2$ | Bi$_2$O$_3$ parts by mass | Co$_3$O$_4$ parts by mass | Mn$_2$O$_3$ parts by mass | Cr$_2$O$_3$ parts by mass |
| 1* | 27.0 | 16.0 | 10.0 | 47.0 | 0 | 0.55 | 0.55 | 0.12 | 0.01 |
| 2 | 23.1 | 23.4 | 8.5 | 40.1 | 4.9 | 0.55 | 0.55 | 0.12 | 0.01 |
| 3 | 19.4 | 30.3 | 7.2 | 33.7 | 9.4 | 0.55 | 0.55 | 0.12 | 0.01 |
| 4 | 16.2 | 36.5 | 5.9 | 27.9 | 13.5 | 0.55 | 0.55 | 0.12 | 0.01 |
| 5* | 13.2 | 41.9 | 4.9 | 23.0 | 17.0 | 0.55 | 0.55 | 0.12 | 0.01 |
| 6* | 19.4 | 30.3 | 7.2 | 33.7 | 9.4 | 0 | 0.55 | 0.12 | 0.01 |
| 7 | 19.4 | 30.3 | 7.2 | 33.7 | 9.4 | 0.30 | 0.55 | 0.12 | 0.01 |
| 8 | 19.4 | 30.3 | 7.2 | 33.7 | 9.4 | 1.20 | 0.55 | 0.12 | 0.01 |
| 9* | 19.4 | 30.3 | 7.2 | 33.7 | 9.4 | 2.00 | 0.55 | 0.12 | 0.01 |
| 10* | 19.4 | 30.3 | 7.2 | 33.7 | 9.4 | 0.55 | 0 | 0.12 | 0.01 |
| 11 | 19.4 | 30.3 | 7.2 | 33.7 | 9.4 | 0.55 | 0.30 | 0.12 | 0.01 |
| 12 | 19.4 | 30.3 | 7.2 | 33.7 | 9.4 | 0.55 | 1.20 | 0.12 | 0.01 |
| 13* | 19.4 | 30.3 | 7.2 | 33.7 | 9.4 | 0.55 | 2.00 | 0.12 | 0.01 |
| 14* | 19.4 | 30.3 | 7.2 | 33.7 | 9.4 | 0.55 | 0.55 | 0 | 0.01 |
| 15 | 19.4 | 30.3 | 7.2 | 33.7 | 9.4 | 0.55 | 0.55 | 0.01 | 0.01 |
| 16 | 19.4 | 30.3 | 7.2 | 33.7 | 9.4 | 0.55 | 0.55 | 0.25 | 0.01 |
| 17* | 19.4 | 30.3 | 7.2 | 33.7 | 9.4 | 0.55 | 0.55 | 0.30 | 0.01 |
| 18* | 19.4 | 30.3 | 7.2 | 33.7 | 9.4 | 0.55 | 0.55 | 0.12 | 0 |
| 19 | 19.4 | 30.3 | 7.2 | 33.7 | 9.4 | 0.55 | 0.55 | 0.12 | 0.003 |
| 20 | 19.4 | 30.3 | 7.2 | 33.7 | 9.4 | 0.55 | 0.55 | 0.12 | 0.03 |
| 21* | 19.4 | 30.3 | 7.2 | 33.7 | 9.4 | 0.55 | 0.55 | 0.12 | 0.05 |

In the table, samples marked with asterisks are Comparative Examples.

Evaluation

Composition

The composition of each of the fabricated samples was analyzed by inductively coupled plasma atomic emission spectroscopy/mass spectrometry (ICP-AES/MS). The results were as shown in Table 1 above.

Flexural Strength

The flexural strength of the single-plate sample was measured by a three-point bending test. The measurement was performed for five specimens of each sample. When at least one of the specimens had a flexural strength of less than 100 MPa, the sample was evaluated as B. When all the specimens had a flexural strength of 100 MPa or more, the sample was evaluated as A. The results are shown in Table 2 below.

Average Crystal Grain Size

The single-plate sample was embedded in a resin, the resulting sample was polished with a polishing machine in the width direction of the sample, and polishing was finished at a depth at which a substantially central portion of the sample was exposed. The resulting section was subjected to focused ion-beam processing (FIB processing) to prepare a section for SEM observation. The FIB processing was performed by using an FIB processing apparatus SMI3050R manufactured by SII NanoTechnology Inc. For the section prepared by FIB processing, a substantially central portion of the sample was photographed with a SEM, and the average crystal grain size was measured. The observation area was 8×8 μm. The results are shown in Table 2 below.

Magnetic Permeability

For the ring-shaped sample, the sample was set in a magnetic material measurement fixture (model number: 16454A) manufactured by Agilent Technologies, Inc., and a magnetic permeability μ' at 10 MHz was measured with an impedance analyzer (model number: E4991A) manufactured by Agilent Technologies, Inc. The results are shown in Table 2 below.

Direct Current Superposition Characteristics

A wire was wound 60 turns around the ring-shaped sample, and a direct current was applied with an impedance analyzer (model number: E4991A) manufactured by Agilent Technologies, Inc. The calculated applied magnetic field and a magnetic permeability at that time were measured to determine an applied magnetic field at which there was a 10% decrease from the initial magnetic permeability. The results are shown in Table 2 below.

TABLE 2

| Sample number | Average crystal grain size (μm) | Flexural strength | Magnetic permeability μ (—) | Direct current superposition characteristics (A/m) |
|---|---|---|---|---|
| 1* | 1.20 | A | 65 | 480 |
| 2 | 0.70 | A | 28 | 3500 |
| 3 | 0.36 | A | 20 | 5200 |
| 4 | 0.34 | A | 16 | 7000 |
| 5* | 0.32 | A | 13 | 9800 |
| 6* | Insufficient sintering | | | |
| 7 | 0.60 | A | 28 | 3800 |
| 8 | 0.30 | A | 14 | 8200 |
| 9* | 0.28 | A | 11 | 11000 |
| 10* | 0.75 | A | 35 | 2800 |
| 11 | 0.55 | A | 25 | 3800 |
| 12 | 0.32 | A | 15 | 7900 |
| 13* | 0.31 | A | 12 | 10000 |
| 14* | 0.90 | B | 29 | 3600 |
| 15 | 0.65 | A | 24 | 4100 |
| 16 | 0.30 | A | 15 | 8100 |
| 17* | 0.28 | A | 12 | 9800 |
| 18* | 0.95 | B | 28 | 3700 |
| 19 | 0.70 | A | 24 | 4200 |
| 20 | 0.28 | A | 16 | 6800 |
| 21* | 0.25 | A | 13 | 9800 |

The results demonstrated that the samples having compositions within the range of the present disclosure had good flexural strength, magnetic permeability, and direct current superposition characteristics.

A ferrite ceramic composition according to the present disclosure can be used as an insulator part of a coil component.

What is claimed is:

1. A ferrite ceramic composition comprising:
as main components,
from 27.0 mol % to 41.0 mol % of Fe in terms of $Fe_2O_3$;
from 16.0 mol % to 24.0 mol % of Ni in terms of NiO;
from 23.0 mol % to 37.0 mol % of Zn in terms of ZnO;
from 5.0 mol % to 9.0 mol % of Cu in terms of CuO; and
from 4.0 mol % to 14.0 mol % of Si in terms of $SiO_2$; and
as sub-components, relative to 100 parts by mass of the main components, from 0.3 parts by mass to 1.2 parts by mass of Bi in terms of $Bi_2O_3$;
from 0.3 parts by mass to 1.2 parts by mass of Co in terms of $Co_3O_4$;
from 0.01 parts by mass to 0.25 parts by mass of Mn in terms of $Mn_2O_3$; and
from 0.003 parts by mass to 0.030 parts by mass of Cr in terms of $Cr_2O_3$.

2. The ferrite ceramic composition according to claim 1, wherein an average crystal grain size of crystal grains in the ferrite ceramic composition is from 0.2 μm to 0.8 μm.

3. The ferrite ceramic composition according to claim 1, wherein an average crystal grain size of crystal grains in the ferrite ceramic composition is from 0.2 μm to 0.5 μm.

4. The ferrite ceramic composition according to claim 1, further comprising:
a magnetic phase containing at least Fe, Ni, Zn, and Cu and a non-magnetic phase containing at least Si and Zn.

5. A coil component comprising:
an insulator part;
a coil that is embedded in the insulator part and includes a plurality of coil conductor layers electrically connected together; and
outer electrodes that are disposed on surfaces of the insulator part and are electrically connected to the coil,
wherein the insulator part is comprised of the ferrite ceramic composition according to claim 1.

6. The coil component according to claim 5, wherein the insulator part has a dimension of from 0.95 mm to 1.05 mm or less in a length direction and a dimension of from 0.45 mm to 0.55 mm in a width direction.

7. The ferrite ceramic composition according to claim 2, wherein
an average crystal grain size of crystal grains in the ferrite ceramic composition is from 0.2 μm to 0.5 μm.

8. The ferrite ceramic composition according to claim 2, further comprising:
a magnetic phase containing at least Fe, Ni, Zn, and Cu and a non-magnetic phase containing at least Si and Zn.

9. The ferrite ceramic composition according to claim 3, further comprising:
a magnetic phase containing at least Fe, Ni, Zn, and Cu and a non-magnetic phase containing at least Si and Zn.

10. The ferrite ceramic composition according to claim 7, further comprising:
a magnetic phase containing at least Fe, Ni, Zn, and Cu and a non-magnetic phase containing at least Si and Zn.

11. A coil component comprising:
an insulator part;
a coil that is embedded in the insulator part and includes a plurality of coil conductor layers electrically connected together; and
outer electrodes that are disposed on surfaces of the insulator part and are electrically connected to the coil,
wherein the insulator part is comprised of the ferrite ceramic composition according to claim 2.

12. A coil component comprising:
an insulator part;
a coil that is embedded in the insulator part and includes a plurality of coil conductor layers electrically connected together; and
outer electrodes that are disposed on surfaces of the insulator part and are electrically connected to the coil,
wherein the insulator part is configured comprised of the ferrite ceramic composition according to claim 3.

13. A coil component comprising:
an insulator part;
a coil that is embedded in the insulator part and includes a plurality of coil conductor layers electrically connected together; and
outer electrodes that are disposed on surfaces of the insulator part and are electrically connected to the coil,
wherein the insulator part is comprised of the ferrite ceramic composition according to claim 4.

14. A coil component comprising:
an insulator part;
a coil that is embedded in the insulator part and includes a plurality of coil conductor layers electrically connected together; and
outer electrodes that are disposed on surfaces of the insulator part and are electrically connected to the coil,
wherein the insulator part is comprised of the ferrite ceramic composition according to claim 7.

15. A coil component comprising:
an insulator part;
a coil that is embedded in the insulator part and includes a plurality of coil conductor layers electrically connected together; and
outer electrodes that are disposed on surfaces of the insulator part and are electrically connected to the coil,
wherein the insulator part is comprised of the ferrite ceramic composition according to claim 8.

16. A coil component comprising:
an insulator part;
a coil that is embedded in the insulator part and includes a plurality of coil conductor layers electrically connected together; and
outer electrodes that are disposed on surfaces of the insulator part and are electrically connected to the coil,
wherein the insulator part is comprised of the ferrite ceramic composition according to claim 9.

17. A coil component comprising:
an insulator part;
a coil that is embedded in the insulator part and includes a plurality of coil conductor layers electrically connected together; and
outer electrodes that are disposed on surfaces of the insulator part and are electrically connected to the coil,
wherein the insulator part is comprised of the ferrite ceramic composition according to claim 10.

18. The coil component according to claim 11, wherein the insulator part has a dimension of from 0.95 mm to 1.05 mm or less in a length direction and a dimension of from 0.45 mm to 0.55 mm in a width direction.

19. The coil component according to claim 12, wherein the insulator part has a dimension of from 0.95 mm to 1.05 mm or less in a length direction and a dimension of from 0.45 mm to 0.55 mm in a width direction.

20. The coil component according to claim 13, wherein the insulator part has a dimension of from 0.95 mm to 1.05 mm or less in a length direction and a dimension of from 0.45 mm to 0.55 mm in a width direction.

* * * * *